US011397339B2

(12) United States Patent
Nieuwenhuis

(10) Patent No.: US 11,397,339 B2
(45) Date of Patent: Jul. 26, 2022

(54) COMPUTER-IMPLEMENTED METHOD FOR DETERMINING CENTRING PARAMETERS

(71) Applicant: Carl Zeiss AG, Oberkochen (DE)

(72) Inventor: Claudia Nieuwenhuis, Aalen (DE)

(73) Assignee: Carl Zeiss AG, Oberkochen (DE)

( * ) Notice: Subject to any disclaimer, the term of this patent is extended or adjusted under 35 U.S.C. 154(b) by 82 days.

(21) Appl. No.: 16/523,075

(22) Filed: Jul. 26, 2019

(65) Prior Publication Data
US 2020/0057316 A1    Feb. 20, 2020

Related U.S. Application Data

(63) Continuation of application No. PCT/EP2018/051751, filed on Jan. 24, 2018.

(30) Foreign Application Priority Data

Jan. 27, 2017  (EP) .................................... 17153560

(51) Int. Cl.
*H04N 5/247*      (2006.01)
*G02C 13/00*      (2006.01)
(Continued)

(52) U.S. Cl.
CPC ....... *G02C 13/005* (2013.01); *G05B 13/0265* (2013.01); *G05B 19/4097* (2013.01); *G06T 7/60* (2013.01); *G06T 7/70* (2017.01); *H04N 5/2252* (2013.01); *H04N 5/2256* (2013.01); *H04N 5/247* (2013.01); *G05B 2219/35134* (2013.01); *G06T 2207/10028* (2013.01); *G06T 2207/30201* (2013.01)

(58) Field of Classification Search
CPC .... G02C 13/005; G06T 7/70; G05B 13/0265; G05B 19/4097
USPC .......................................................... 348/77
See application file for complete search history.

(56) References Cited

U.S. PATENT DOCUMENTS 6,792,401 B1   9/2004  Nigro et al.
2003/0081173 A1  5/2003  Dreher
(Continued)

FOREIGN PATENT DOCUMENTS

FR          2987908 A1     9/2013

OTHER PUBLICATIONS

Hartley et al.: "Multiple View Geometry in Computer Vision," 2nd edition, pp. 1 to 8, Cambridge University Press 2004.
(Continued)

*Primary Examiner* — Nguyen T Truong
(74) *Attorney, Agent, or Firm* — Tautz & Schuhmacher LLC; Georg Hasselmann

(57) ABSTRACT

A computer-implemented method for determining centring is disclosed. At least two calibrated images of the head which are captured simultaneously from different viewing directions are provided, and geometric parameters which describe the position of the eyes are determined by geometric position determination. A three-dimensional data set describing geometric parameters of the frame front is provided; the geometric parameters of the frame front and the geometric parameters describing the position of the eyes are brought into relation to each other with a rigid transformation; and the centring parameters are calculated from the geometric parameters describing the frame front and those describing the position of the eyes.

31 Claims, 4 Drawing Sheets

Figure 1A:
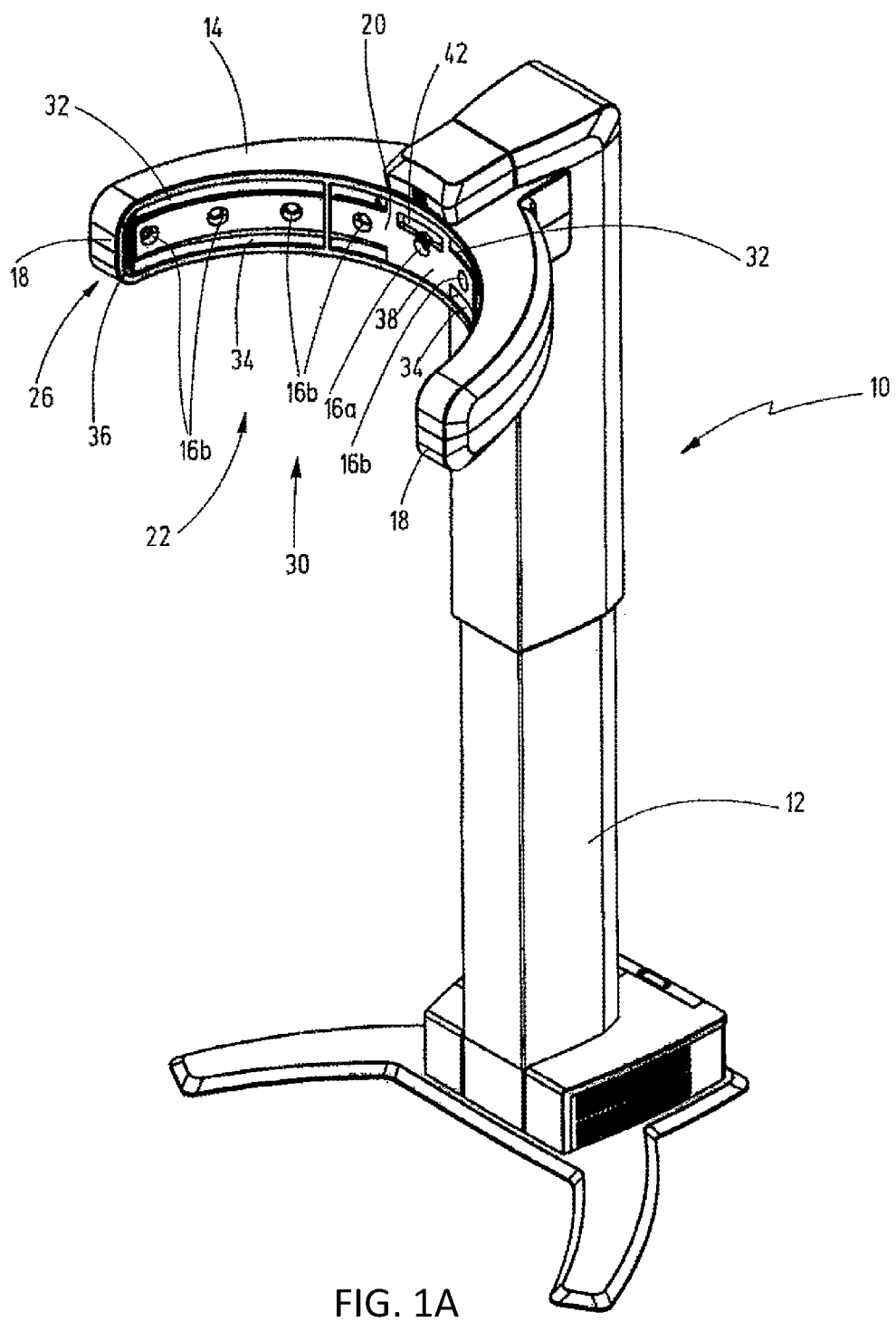
Figure 1B:
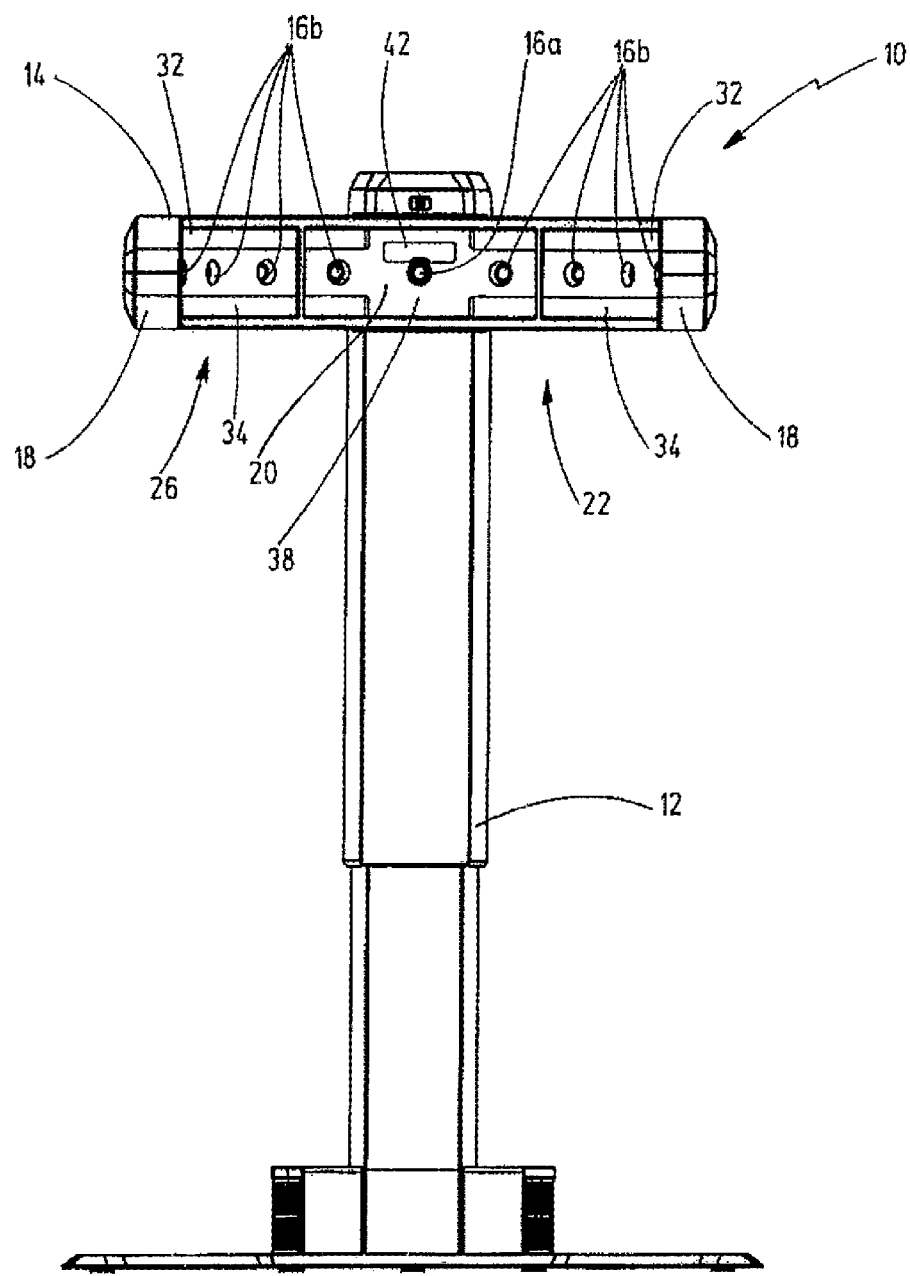

(51) Int. Cl.
  *G06T 7/70* (2017.01)
  *G05B 13/02* (2006.01)
  *G05B 19/4097* (2006.01)
  *G06T 7/60* (2017.01)
  *H04N 5/225* (2006.01)

(56) References Cited

U.S. PATENT DOCUMENTS

2013/0088490 A1  4/2013  Rasmussen et al.
2015/0055085 A1  2/2015  Fonte et al.
2015/0304530 A1  10/2015  Courteille et al.

OTHER PUBLICATIONS

DIN EN ISO 13666 (Ophthalmic optics—Spectacle lenses), dated Oct. 2013.

Internet citation "Machine Learning—Wikipedia," retrieved from internet: <url:https://en.wikipedia.org/wiki/Machine_learning>, last accessed Nov. 8, 2019.

Internet citation "Segmentation (Image processing)—Wikipedia," retrieved from internet: <url:https://en.wikipedia.org/wiki/Machine_learning>, last accessed Nov. 8, 2019.

Extended European Search Report issued in EP 17153560.2, to which this application claims priority, dated Jul. 7, 2017.

International search report issued in international application PCT/EP2018/051751, to which this application claims priority, and English-language translation thereof, dated Apr. 20, 2018.

International preliminary examination report issued in international application PCT/EP2018/051751, to which this application claims priority, dated Apr. 29, 2019, and English-language translation thereof.

Office action by the Chinese patent office issued in CN 201880022350.4, which is a counterpart hereof, dated May 6, 2020, and English-language translation thereof.

Office action by the European patent office issued in EP 18702189.4, which is a counterpart hereof, dated May 27, 2022, and English-language translation thereof.

COMPUTER-IMPLEMENTED METHOD FOR DETERMINING CENTRING PARAMETERS

CROSS REFERENCE TO RELATED APPLICATIONS

This application is a continuation application of international application PCT/EP2018/051751, filed Jan. 24, 2018, which claims priority to European patent application EP 17153560.2, filed Jan. 27, 2017, both of which are hereby incorporated by reference in their entireties.

TECHNICAL FIELD

The disclosure relates to a computer-implemented method for determining centration parameters wherein at least two images, calibrated with respect to one another, of the head that are recorded from different directions of view are provided.

BACKGROUND

Centration parameters are used to correctly arrange or center spectacle lenses in a spectacle frame such that the spectacle lenses are arranged at the correct position relative to the eyes of the person wearing the spectacles. Here, these are in part anatomical parameters of the relevant person such as, e.g., the interpupillary distance, in part purely frame-specific parameters such as the lens width or the lens height and in part combinations of anatomical and frame-specific parameters, such as the vertex distance and the fitting point height. An overview of conventional centration parameters is provided by DIN EN ISO 13666, dated October 2013.

Distances and dimensions that are relevant to the production and the grinding of the spectacle lenses are measured with the aid of centration apparatuses for the centration of spectacle lenses. It is important for the ophthalmic optician to have an as rapid and error-free workflow as possible to achieve high-quality advice, which focuses on the end customer and is not dominated by technical processes. In this context, a mode of functioning that is as disruption-free as possible (robustness) is required, with a simultaneous high precision of the automatic methods. This can be achieved by processes of digital image analysis and of machine learning, and with the inclusion of model knowledge. Here, the centration apparatus is equipped with a plurality of cameras that simultaneously record a plurality of images of the end customer. In previous centration apparatuses, the customer wears a frame in the process. Features such as pupil center and frame rim are detected automatically and the sub-pixel accurate position thereof are determined automatically in the images. Subsequently, the relevant parameters for the spectacle lens centration can be ascertained on the basis of these measured image positions and with the aid of centration algorithms. However, this does not allow to carry out centration measurements of spectacle frames that are not available in the optician's store.

U.S. Pat. No. 6,792,401 B1 discloses a method for fitting spectacle lenses and spectacles, in which image data of the head of a subject are related to views of spectacle frames with the aid of a test frame. US 2015/0055085 A1 discloses a method of the type set forth at the outset, in which a plurality of calibrated images of a subject are used to produce a point cloud describing their eye portions. A frame is "placed" onto the "head" present in the form of a point cloud in virtual fashion, the frame already being available in the form of CAD data records provided by the frame manufacturer. However, this method cannot be carried out if the CAD data record is not available from the frame manufacturer, the CAD data record usually being treated as a company secret by frame manufacturers. Moreover, reference objects are used to scale the model of the head to the correct size.

SUMMARY

It is therefore an object of the disclosure to develop a method of the type set forth at the outset in such a way that it facilitates a better selection of spectacle frames for the customer.

Proceeding from US 2015/0055085 A1, the method according to the disclosure achieves the object of providing a simpler method by virtue of there being no need for a reference object such as a test frame, for example, which is regularly perceived as uncomfortable by the customer.

Proceeding from US 2015/0055085 A1, the method achieves the object of providing a method that facilitates the determination of centration parameters, even without the presence of data from the frame manufacturer.

Proceeding from US 2015/0055085 A1, the method achieves the object of providing a simpler method. A point cloud comprises less data than a CAD data record, and so less computational power is required to carry out the method.

The disclosure is based on the concept of also undertaking centration measurements of the customer with spectacle frames that are not present in the store but only present as a 3D data record. As a result, it is possible to provide the customer with a much larger number of spectacle frames for selection than would even find space in a store. Moreover, spectacle frames that are specifically individualized to the customer can also be measured before they are even produced. This allows the customer to try a much greater variation of spectacle frames, and let these be measured at the same time, without even having to put on the spectacle frame. Here, it is sufficient if the data record describing the geometric parameters of the spectacle frame, that describe the geometry of the spectacle frame, is provided as at least one three-dimensional point cloud—no metadata such as tracer contour of the spectacle lenses, etc., are required. In the process, images calibrated with respect to one another are provided. The calibration thereof comprises the extrinsic properties of the cameras recording the images or of the camera recording the images, such as the relative alignment of their optical axes and the relative arrangement with respect to one another in space, and their intrinsic properties, i.e., the properties of the cameras themselves or of the camera itself, which define how a point in space, which is situated in the internal coordinate system of the respective camera, is mapped onto the coordinates of the pixels of the recorded image. A detailed description of the calibration of cameras is found in the textbook entitled "Multiple View Geometry in Computer Vision" by Richard Hartley and Andrew Zisserman, 2nd edition, Cambridge University Press 2004, and, in particular, on page 8 therein.

Geometric parameters describing the position of the eyes are ascertained by means of a geometric determination of position. A three-dimensional data record describing geometric parameters of the spectacle frame is provided and the geometric parameters of the spectacle frame and the geometric parameters describing the position of the eyes are related to one another by means of a rigid transformation. The centration parameters are subsequently calculated from the geometric parameters describing the spectacle frame and describing the position of the eyes. A rigid transformation is understood to mean a translation, a rotation or mirroring, or combinations thereof.

For the purposes of simplifying the method, the data record describing the geometric parameters of the spectacle frame can be generated by means of a segmentation of the silhouettes of the spectacle frame in the individual images and/or by means of a 3D reconstruction method and/or by means of a method for machine learning.

Machine learning is an umbrella term for the "artificial" generation of knowledge from experience: An artificial system learns from examples and can generalize these after completion of the learning phase. That is to say, examples are not simply memorized; instead, it "recognizes" patterns and regularities in the learning data. Hence, the system can also assess unknown data. An overview of machine learning is provided in the "machine learning" Wikipedia article, which is appended to this application and which is expressly referred to in this context. The aforementioned Wikipedia article also provides an overview of various approaches and algorithms which may be used here.

Segmentation is a branch of digital image processing and machine vision. The production of regions of an image that are related in terms of content by combining adjacent pixels in accordance with a certain homogeneity criterion is referred to as a segmentation. It is usually used to find objects or edges in the image. An overview of segmentation is provided in the "segmentation (image processing)" Wikipedia article, together with various algorithmic approaches. This article is appended to this application and expressly referred to in this context.

A 3D reconstruction method should be understood to mean the following: Conventional cameras produce images by the projection of a three-dimensional scene onto a two-dimensional plane (i.e., the image plane). A dimension is lost during this imaging, the dimension corresponding to the depth of the image, i.e., the distance between the camera and the imaged object. The depth information can be regained by means of a 3D reconstruction method from the two (or more) images recorded from different directions of view. A three-dimensional model (i.e., a 3D reconstruction) of the scene can immediately be created from the obtained image depth and it can subsequently be textured using the camera images.

Usually, a 3D reconstruction method proceeds as follows:
Find corresponding points in both images.
Carry out a triangulation for all found correspondences, taking account of the internal and external geometry of the cameras (calibration), in order to obtain the three-dimensional points.

The data record describing the geometric parameters of the spectacle frame can be provided in the form of a plurality of point clouds, each point cloud describing part of the spectacle frame. Moreover, it is typical for the data record describing the geometric parameters of the spectacle frame to comprise the orientation of the point cloud in space. As an alternative thereto, it is also possible for the orientation of the point cloud in space to be calculated by virtue of the individual parts of the frame being identified automatically and the sides thereupon being oriented in a typical direction, e.g., toward the back.

The data record describing the geometric parameters of the spectacle frame expediently comprises predetermined or calculated prominent points, in particular a prominent point sequence, of the spectacle frame. These may be the position and/or the orientation of the axes for the hinges of the sides and/or the center of the bridge and/or the ear bearing points and/or the frame inner rim and/or the lens outer rim and/or the endpoints of the sides. A further simplification of the method is obtained if the data record describing the geometric parameters of the spectacle frame is projected onto a two-dimensional plane. According to an exemplary embodiment of the disclosure, the lens rims belonging to the spectacle frame are determined from the data record describing the geometric parameters of the spectacle frame. Here, expediently, a three-dimensional model for the lenses of the spectacles are approximately fitted to the determined lens rims. This three-dimensional model for the spectacle lenses may comprise lens surfaces and/or lens planes or, in a simpler variant, may consist of lens planes.

Furthermore, it is possible to fit a three-dimensional model for the spectacle frame and/or parts of the spectacle frame and/or the lenses of the spectacles approximately to the three-dimensional data record.

The three-dimensional model can be a parametric model, the parameters of which are fitted by means of an optimization method to the three-dimensional data record which, for example, contains the point cloud or the plurality of point clouds. However, the three-dimensional model can also be produced from example data by means of machine learning.

Various methods can be applied for the geometric determination of position. However, it is typical for the geometric determination of position to comprise a triangulation method. The data record describing the geometric parameters of the spectacle frame can also be produced by means of a triangulation method.

Typically, the computer-implemented method according to the disclosure is carried out using an apparatus as described in detail below and in the following description of the figures.

The centration data, determined according to the disclosure, may advantageously be used for centering a spectacle lens in a spectacle frame and/or for grinding a spectacle lens into a spectacle frame. Here, the at least one spectacle lens is centered in the spectacle frame using the determined centration parameters in one method step or the at least one spectacle lens is ground for an arrangement in the spectacle frame on the basis of the determined centration parameters. Spectacle lenses and spectacles can be manufactured in this way.

Figure 2A:
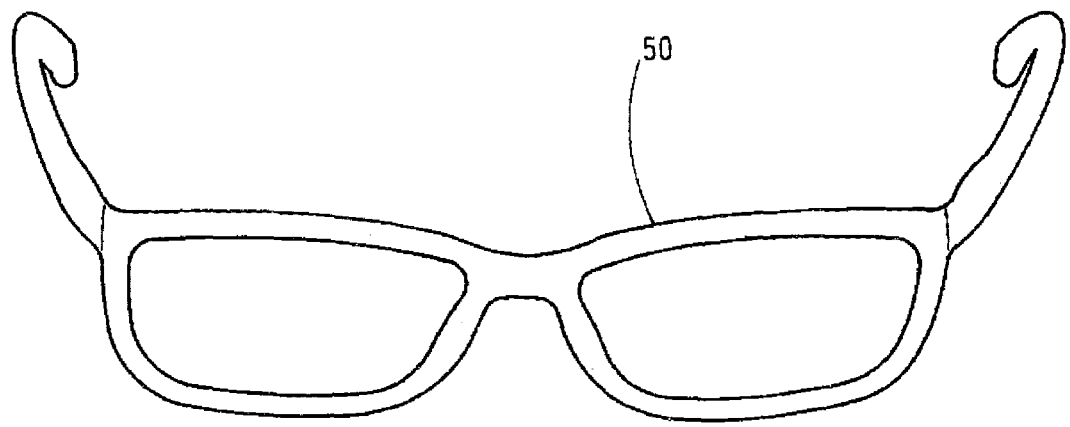
Figure 2B:
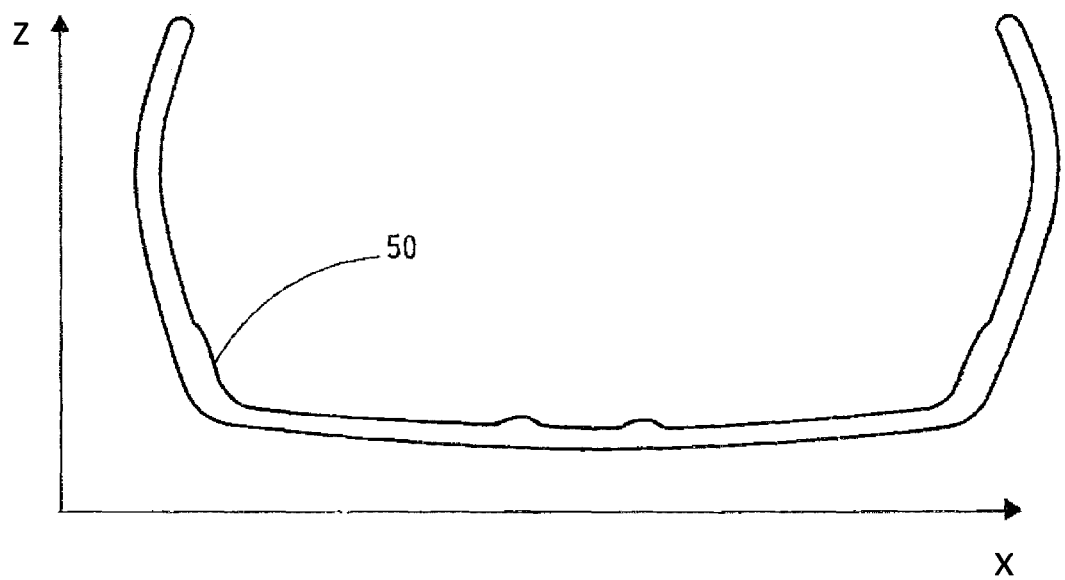
Figure 3:
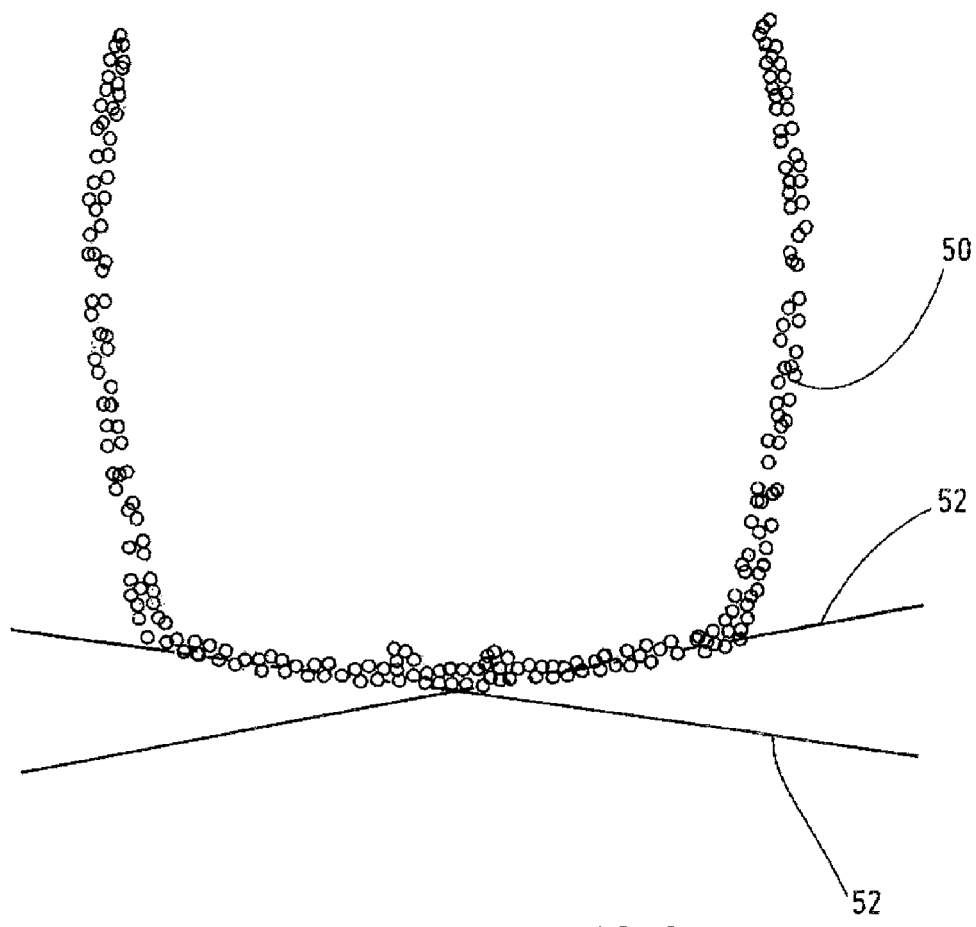

The disclosure will now be described with reference to the drawings wherein:

FIGS. 1a, b show an apparatus for determining centration parameters in a perspective view and in a view from the front;

FIGS. 2a, b show the representation of a spectacle frame before and after the orientation in space, and FIG. 3 shows the representation of the spectacle frame according to FIG. 2b as a three-dimensional point cloud with fitted lens planes.

DESCRIPTION OF EXEMPLARY EMBODIMENTS

The apparatus 10 illustrated in the drawing serves to determine centration parameters for fitting spectacles. It has a column 12 which, in a height-adjustable manner, carries a rigid camera carrier 14 which, in turn, carries a number of cameras 16a, 16b. In a plan view, the camera carrier 14 is bent into an approximately circular shape and it extends between two free ends 18 which are arranged at a distance from one another. An inner face 20 of the camera carrier 14 encloses an interior 22, in which the head of a subject is situated when images are recorded by the cameras 16a, 16b, to the front, i.e. towards the column 12, and to the sides. In a direction extending between the free ends 18, the inner face 20 is bent in a concave manner and it has, for example, the form of a portion of a lateral face of a cylinder, wherein the cylinder may have a circular or oval base. A lifting device, not illustrated in any more detail, is arranged in the column 12 in order to be able to position the camera carrier 14 at the correct height in relation to the head of the subject, it being possible to move the camera carrier 14 up-and-down in a motor-driven manner by way of the lifting device.

All cameras 16a, 16b are arranged in a camera arrangement 26 that extends between the free ends 18. In the present exemplary embodiment, the camera arrangement 26 is embodied as a camera row 26, the cameras 16a, 16b of which are all situated at the same height, with their optical axes being directed into the interior 22. In the present exemplary embodiment, the camera row 26 comprises a frontal camera 16a arranged in the center of the camera carrier 14, the optical axis of the frontal camera being directed frontally onto the face of the subject, and eight lateral cameras 16b that are arranged symmetrically in pairs in respect of a perpendicular plane of symmetry extending through the optical axis of the frontal camera 16a, four of the lateral cameras being directed onto the face of the subject from the left and four being directed onto the face of the subject from the right in each case. Moreover, the cameras 16a, 16b are calibrated in such a way that they are able to record calibrated images of the subject at the same time. The calibration comprises the extrinsic properties, such as the relative alignment of their optical axes and the relative arrangement with respect to one another in space, and their intrinsic properties, i.e. the properties of the cameras themselves, which define how a point in space, which is situated in the internal coordinate system of the respective camera, is mapped onto the coordinates of the pixels of the recorded image.

The camera carrier 14 only encloses the interior 22 to the front, towards the column 12, and to the sides, i.e., to the left and right of the head of the subject. Toward the top, the bottom and toward a rear side 30, the interior is open, wherein the free ends 18 have a distance from one another of at least 25 cm such that the subject can comfortably approach from the rear side. The distance is 70 to 80 cm in the shown exemplary embodiment.

In order to illuminate the interior 22, provision is made of an illumination device having an upper light strip 32 extending above the camera row 26 and a lower light strip 34 extending below the camera row 26, the light strips having a multiplicity of LEDs as lighting means in each case. The upper light strip 32 and the lower light strip 34 each extend, continuously or with interruptions, over a length which is at least as long as the length of the length of the camera row 26 as measured in the circumferential direction between the free ends 18. This corresponds to a circumferential angle of at least 160 degrees. Near the free ends 18, the upper light strip 32 and the lower light strip 34 are connected to one another, in each case by means of a further light strip 36 that extends in the vertical direction. Consequently, the camera row 26 is framed in the entirety thereof by at least one row of LEDs. The apparatus 10 moreover has an open-loop or closed-loop control device, not illustrated in any more detail in the drawing, by means of which the light intensity emitted by the LEDs can be controlled or regulated depending on the light intensity detected by the cameras 16a, 16b. Here, the LEDs of the light strips 32, 34, 36 are combined into sectors, the emitted light intensities of which can be controlled or regulated separately from one another. Moreover, provision is made for the light intensities emitted by the individual LEDs also to be able to be controlled or regulated separately from one another by means of the open-loop or closed-loop control device.

In order to be able to correctly position the subject in the interior 22, the two lateral cameras 16b closest to the frontal camera 16a are configured to measure the distance of the head of the subject from the center 38 of the camera carrier 14. The subject is shown whether or not they are standing correctly by means of a display unit, which is not illustrated in any more detail. The display unit has a plurality of differently colored light sources arranged in a row. The central light source lights up green when the subject stands correctly. Proceeding from the central light source, there is, in this sequence, a yellow, an orange and a red light source in each direction, the light sources indicating, in accordance with their color, if the subject is slightly, clearly or much too far away from the center 38 of the camera carrier 14 or if the subject stands slightly, clearly or much too close to the center 38. In order to ensure that the viewing direction of the subject is directed to infinity when determining the centration parameters, a fixation device 42 arranged at the camera carrier 14 is provided, the fixation device producing a fixation pattern in the form of a speckle pattern for the subject. The fixation pattern is arranged slightly higher than the frontal camera 16a so that the subject peers over the latter. In this way, their face can be recorded to the greatest possible extent.

The apparatus 10 is also suited, in particular, to produce an avatar of the head of the subject, which may be used for determining the centration parameters. To this end, calibrated images of the head of the subject without spectacles or spectacle frame are recorded by the cameras 16a, 16b. A depth profile of the head, which images the latter very well as an approximation, is created by means of a suitable process for a geometric determination of position, such as triangulation. The head is imaged by a multiplicity of points which can be connected to one another by means of a mesh pattern or else be stored as a point cloud. In the subsequent determination of the centration parameters, the avatar thus ascertained may be used to determine centration parameters which cannot be determined, or can only be determined approximately, on account of the geometric properties of the spectacles or the spectacle frame worn by the subject. By way of example, a wide frame side may cover the eye in a lateral recording to such an extent that the vertex distance cannot be determined or can only be determined very inaccurately. Moreover, tinted or strongly reflecting spectacle lenses may not allow the eyes to be identified, or only be identified very badly. In order to counteract this, the depth profile of the avatar is projected onto the images, recorded by the cameras 16a, 16b, of the subject wearing the spectacles or spectacle frame and the centration parameters, which can only be determined very unsatisfactorily on account of the sight being restricted by the spectacles or spectacle frame, are determined by means of the image data of the avatar. Here, for the purposes of minimizing deviations, the avatar may be fitted to the images of the subject wearing the spectacles or spectacle frame.

As an alternative or in addition to the production of the avatar, the apparatus 10 can be used as set forth below to carry out a computer-implemented method for determining centration parameters.

Initially, calibrated images of the head of the subject, which were recorded at the same time, are provided by the cameras 16a, 16b. Geometric parameters describing the position of the eyes are ascertained from these images by means of a geometric determination of position, in particular by means of triangulation. In particular, the above-described avatar can also be used to this end. A three-dimensional data record describing the geometric parameters of the spectacle frame is thereupon provided, as elucidated in FIG. 2a on the basis of an ophthalmic frame 50. For simplification purposes, the ophthalmic frame 50, which is available as a three-dimensional point cloud, is represented in simplified fashion in FIG. 2a by full lines and not in the form of points. By means of the rigid transformation or rigid body simulation, the three-dimensional point cloud describing the ophthalmic frame 50 is brought into a wear position in relation to the parameters defining the position of the eyes, for the purposes of which it is rotated and virtually "placed" onto the head. FIG. 2b elucidates rotation to in coordinate system of the camera 16a, 16b, with the z-direction being predetermined by the direction of view of the frontal camera 16a. Centration parameters, such as the vertex distance, for example, are determined on the basis of the geometric parameters describing the position of the eyes and the geometric parameters describing the spectacle frame in the wear position. For the purposes of simplifying the method, the lenses of the spectacles are approximately represented by planes 52, as shown in FIG. 3 where the spectacle frame 50 is also represented by a point cloud. For this purpose, the lens rims belonging to the spectacle frame are determined from the data record describing the geometric parameters of the spectacle frame, and a three-dimensional model for the lenses of the spectacles is approximately fitted to the determined lens rims, with this model consisting of the lens planes 52.

Exemplary embodiments of the disclosure are reproduced in the following clauses:

Clause 1: A computer-implemented method for determining centration parameters, wherein at least two images of the head that are recorded from different directions of view and calibrated with respect to one another are provided and wherein geometric parameters describing the position of the eyes are ascertained by means of a geometric determination of position, wherein a three-dimensional data record describing geometric parameters of the spectacle frame is provided, wherein the geometric parameters of the spectacle frame and the geometric parameters describing the position of the eyes are related to one another by means of a rigid transformation and wherein the centration parameters are calculated from the geometric parameters describing the spectacle frame and describing the position of the eyes.

Clause 2: The computer-implemented method according to clause 1, characterized in that the data record describing the geometric parameters of the spectacle frame is provided as at least one three-dimensional point cloud.

Clause 3: The computer-implemented method according to clause 2, characterized in that a plurality of point clouds are provided for different parts of the spectacle frame.

Clause 4: The computer-implemented method according to clause 2 or 3, characterized in that the data record describing the geometric parameters of the spectacle frame comprises an orientation of the at least one point cloud in space.

Clause 5: The computer-implemented method according to either of clauses 2 and 3, characterized in that an orientation of the at least one point cloud in space is calculated.

Clause 6: The computer-implemented method according to any one of the preceding clauses, characterized in that the data record describing the geometric parameters of the spectacle frame comprises one or more predetermined points of the spectacle frame.

Clause 7: The computer-implemented method according to any one of the preceding clauses, characterized in that the lens rims belonging to the spectacle frame are determined from the data record describing the geometric parameters of the spectacle frame.

Clause 8: The computer-implemented method according to any one of the preceding clauses, characterized in that a three-dimensional model for the spectacle frame and/or parts of the spectacle frame and/or the lenses of the spectacles are/is approximately fitted to the three-dimensional data record or to the determined lens rims.

Clause 9: The computer-implemented method according to clause 8, characterized in that the three-dimensional model for the spectacle lenses comprises or consists of lens surfaces and/or lens planes (52).

Clause 10: The computer-implemented method according to either of clauses 8 and 9, characterized in that the three-dimensional model is a parametric model, the parameters of which are fitted.

Clause 11: Computer-implemented method according to any one of the preceding clauses, characterized in that the geometric determination of position comprises a triangulation method.

Clause 12: A computer program with program code for carrying out all of the method steps according to any one of the preceding clauses, when the computer program is loaded onto a computer and executed on a computer.

Clause 13: The use of an apparatus (10) for carrying out a computer-implemented method according to any one of clauses 1 to 9, wherein the apparatus (10) comprises a camera carrier (14), which partly encloses an interior (22) that is open to the top, to the bottom and to a rear side (30) and which carries at least three cameras (16a, 16b) which are arranged between two free ends (18) of the camera carrier (14) and are directed onto the interior (22), wherein the camera carrier (14) has an illumination device (32, 34, 36) for illuminating the interior (22).

Clause 14: A computer, comprising a memory, wherein the computer program according to clause 12 is stored in the memory, and a processor for executing the computer program stored in the memory.

Clause 15: The computer according to clause 14, characterized in that the processor is configured to provide at least two calibrated images of the head recorded at the same time from different directions of view and to ascertain geometric parameters describing the position of the eyes by means of a geometric determination of position, to provide a three-dimensional data record describing geometric parameters of the spectacle frame, to relate the geometric parameters of the spectacle frame and the geometric parameters describing the position of the eyes to one another by means of a rigid transformation and to calculate the centration parameters from the geometric parameters describing the spectacle frame and describing the position of the eyes.

The foregoing description of the exemplary embodiments of the disclosure illustrates and describes the present invention. Additionally, the disclosure shows and describes only the exemplary embodiments but, as mentioned above, it is to be understood that the disclosure is capable of use in various other combinations, modifications, and environments and is capable of changes or modifications within the scope of the concept as expressed herein, commensurate with the above teachings and/or the skill or knowledge of the relevant art.

The term "comprising" (and its grammatical variations) as used herein is used in the inclusive sense of "having" or "including" and not in the exclusive sense of "consisting only of." The terms "a" and "the" as used herein are understood to encompass the plural as well as the singular.

The invention claimed is:

1. A computer-implemented method for determining centration parameters, the method comprising:
   providing at least two images of a head of a subject, wherein the at least two images are calibrated with respect to one another, wherein the at least two images are recorded from different directions of view, and wherein geometric parameters describing a position of eyes of the subject are ascertained by a geometric determination of position;
   providing a three-dimensional data record describing geometric parameters of a spectacle frame, wherein the geometric parameters of the spectacle frame and the geometric parameters describing the position of the eyes of the subject are related to one another by a rigid transformation;
   calculating the centration parameters from the geometric parameters describing the spectacle frame and describing the position of the eyes of the subject; and
   providing the data record describing the geometric parameters of the spectacle frame as at least one three-dimensional point cloud.

2. The computer-implemented method as claimed in claim 1, wherein a plurality of three-dimensional point clouds is provided for different parts of the spectacle frame.

3. The computer implemented method as claimed in claim 1, wherein the data record describing the geometric parameters of the spectacle frame comprises an orientation of the at least one three-dimensional point cloud in space.

4. The computer-implemented method as claimed in claim 1, further comprising:
   calculating an orientation of the at least one three-dimensional point cloud in space.

5. The computer-implemented method as claimed in claim 1, further comprising:
   generating the data record describing the geometric parameters of the spectacle frame with at least one of:
      a segmentation of silhouettes of the spectacle frame in the individual images,
      a 3D reconstruction method, or
      a machine learning method.

6. The computer-implemented method as claimed in claim 1, wherein the data record describing the geometric parameters of the spectacle frame is generated from the at least two images of the head subject wearing the spectacle frame or from at least two images, calibrated with respect to one another, of the spectacle frame.

7. The computer-implemented method as claimed in claim 1, wherein the data record describing the geometric parameters of the spectacle frame comprises one or more predetermined points of the spectacle frame or wherein points of the spectacle frame are calculated.

8. The computer-implemented method as claimed in claim 1, wherein the spectacle frame has lens rims, and wherein the lens rims are determined from the data record describing the geometric parameters of the spectacle frame.

9. The computer-implemented method as claimed in claim 8, further comprising:
   approximately fitting at least one of:
      a three-dimensional model for the spectacle frame, parts of the spectacle frame, or
      the lenses of the spectacles to the three-dimensional data record or to the determined lens rims.

10. The computer-implemented method as claimed in claim 9, wherein the three-dimensional model for the spectacle lenses comprises or consists of lens surfaces, lens planes, or lens surfaces and lens planes.

11. The computer-implemented method as claimed in claim 9, wherein the three-dimensional model is a parametric model, and wherein parameters of the parametric model are fitted.

12. The computer-implemented method as claimed in claim 9, wherein the three-dimensional model is produced from example data by means of machine learning.

13. The computer-implemented method as claimed in claim 1, further comprising:
   projecting the data record describing the geometric parameters of the spectacle frame onto a two-dimensional plane.

14. The computer-implemented method as claimed in claim 1, wherein the geometric determination of position and/or the production of the data record describing the geometric parameters of the spectacle frame comprises a triangulation method.

15. A computer program stored on a non-transitory storage medium and having program code for carrying out the method as claimed in claim 1, when the computer program is loaded onto a computer and executed on the computer.

16. A computer, comprising a non-transitory storage memory, wherein the computer program as claimed in claim 15 is stored in the non-transitory storage memory, and a processor configured to execute the computer program stored in the non-transitory storage memory.

17. The computer as claimed in claim 16, wherein the processor is configured to provide at least two calibrated images of the head recorded at the same time from different directions of view and to ascertain geometric parameters describing the position of the eyes by a geometric determination of position, to provide a three-dimensional data record describing geometric parameters of the spectacle frame, to relate the geometric parameters of the spectacle frame and the geometric parameters describing the position of the eyes to one another with a rigid transformation and to calculate the centration parameters from the geometric parameters describing the spectacle frame and describing the position of the eyes.

18. A process of utilizing an apparatus for carrying out a computer-implemented method as claimed in claim 1, wherein the apparatus comprises:
   a camera carrier, which partly encloses an interior that is open to a top, to a bottom and to a rear side of the apparatus, wherein the camera carrier carries at least three cameras which are arranged between two free ends of the camera carrier and directed toward the interior; and
   an illumination device configured to illuminate the interior and being mounted on the camera carrier.

19. A method for centering at least one spectacle lens in a spectacle frame, the method comprising:
   determining the centration parameters with the method as claimed in claim 1, and
   centering the at least one spectacle lens with the determined centration parameters in the spectacle frame.

20. A method for producing a pair of spectacles, the method comprising:
   centering a first and a second spectacle lens of the pair of spectacles with the method as claimed in claim 19.

21. A method for grinding at least one spectacle lens into a spectacle frame, the method comprising:
   determining the centration parameters with the method as claimed in claim 1, and
   grinding the at least one spectacle lens; and
   arranging the at least one spectacle lens in the spectacle frame on the basis of the determined centration parameters.

22. A method for producing a spectacle lens, the method comprising:
   grinding the spectacle lens into a spectacle frame according to the method as claimed in claim 21.

23. A computer-implemented method for determining centration parameters, the method comprising:
   providing at least two images of a head of a subject, wherein the at least two images are calibrated with respect to one another, wherein the at least two images are recorded from different directions of view, and wherein geometric parameters describing a position of eyes of the subject are ascertained by a geometric determination of position;
   providing a three-dimensional data record describing geometric parameters of a spectacle frame, wherein the geometric parameters of the spectacle frame and the geometric parameters describing the position of the eyes of the subject are related to one another by a rigid transformation;
   calculating the centration parameters from the geometric parameters describing the spectacle frame and describing the position of the eyes of the subject,
   wherein the centration parameters are calculated from the geometric parameters describing the spectacle frame and describing the position of the eyes subject, and wherein the geometric parameters of the spectacle frame and the geometric parameters describing the position of the eyes of the subject are related to one another without provision of a reference object that defines a position and orientation in space or that defines a scale, wherein the data record describing the geometric parameters of the spectacle frame is generated with at least one of:
   a segmentation of the silhouettes of the spectacle frame in the individual images,
   a 3D reconstruction method, or
   a machine learning method.

24. A computer-implemented method for determining centration parameters, the method comprising:
   providing at least two images of a head of a subject, wherein the at least two images are calibrated with respect to one another, wherein the at least two images are recorded from different directions of view, and wherein geometric parameters describing a position of eyes of the subject are ascertained by a geometric determination of position;
   providing a three-dimensional data record describing geometric parameters of a spectacle frame, wherein the geometric parameters of the spectacle frame and the geometric parameters describing the position of the eyes of the subject are related to one another by a rigid transformation;
   calculating the centration parameters from the geometric parameters describing the spectacle frame and describing the position of the eyes of the subject,
   wherein the centration parameters are calculated from the geometric parameters describing the spectacle frame and describing the position of the eyes subject, and wherein the data record describing the geometric parameters of the spectacle frame is generated from at least two images, calibrated with respect to one another, of the spectacle frame, and wherein the data record describing the geometric parameters of the spectacle frame is generated by at least one of:
   a segmentation of the silhouettes of the spectacle frame in the individual images,
   a 3D reconstruction method, or
   a machine learning method.

25. A computer-implemented method for determining centration parameters, the method comprising:
   providing at least two images of a head of a subject, wherein the at least two images are calibrated with respect to one another, wherein the at least two images are recorded from different directions of view, and wherein geometric parameters describing a position of eyes of the subject are ascertained by a geometric determination of position;
   providing a three-dimensional data record describing geometric parameters of a spectacle frame, wherein the geometric parameters of the spectacle frame and the geometric parameters describing the position of the eyes of the subject are related to one another by a rigid transformation;
   calculating the centration parameters from the geometric parameters describing the spectacle frame and describing the position of the eyes of the subject,
   wherein the centration parameters are calculated from the geometric parameters describing the spectacle frame and describing the position of the eyes subject, and wherein the data record describing the geometric parameters of the spectacle frame is generated from at least two images, calibrated with respect to one another, of the head of the subject wearing the spectacle frame, and wherein the data record describing the geometric parameters of the spectacle frame is generated by at least one of:
   a segmentation of the silhouettes of the spectacle frame in the individual images,
   a 3D reconstruction method, or
   a machine learning method.

26. An apparatus for determining centration parameters, the apparatus comprising:
   a first camera for recording a first image from a first direction of view,
   a second camera, calibrated with respect to the first camera, configured to record a second image from a second direction of view that differs from the first direction of view, and
   a computer having a non-transitory storage memory in which a computer program is stored, the computer program comprising program code instructing the apparatus to:
   provide at least two calibrated images, recorded from different directions of view, of the head of a subject;
   ascertain geometric parameters that describe the position of the eyes with a geometric determination of position;
   provide a three-dimensional data record describing geometric parameters of a spectacle frame;
   relate the geometric parameters of the spectacle frame and the geometric parameters describing the position of the eyes to one another, and
   calculate the centration parameters from the geometric parameters describing the spectacle frame and describing the position of the eyes,
   wherein the geometric parameters describing the geometric parameters of the spectacle frame and the geometric parameters describing the position of the eyes are related to one another without provision of a reference object defining a position or orientation in space or defining a scale, and wherein the computer has a processor for executing the computer program stored in the non-transitory storage memory.

27. An apparatus for determining centration parameters, the apparatus comprising:
a first camera for recording a first image from a first direction of view,
a second camera, calibrated with respect to the first camera, configured to record a second image from a second direction of view that differs from the first direction of view, and
a computer having a non-transitory storage memory in which a computer program is stored, the computer program comprising program code instructing the apparatus to:
provide at least two calibrated images, recorded from different directions of view, of the head of a subject;
ascertain geometric parameters that describe the position of the eyes with a geometric determination of position;
provide a three-dimensional data record describing geometric parameters of a spectacle frame;
relate the geometric parameters of the spectacle frame and the geometric parameters describing the position of the eyes to one another, and
calculate the centration parameters from the geometric parameters describing the spectacle frame and describing the position of the eyes,
wherein the data record describing the geometric parameters of the spectacle frame is generated from at least two images, calibrated with respect to one another, of the head wearing the spectacle frame or of at least two images, calibrated with respect to one another, of the spectacle frame, and wherein the computer has a processor for executing the computer program stored in the non-transitory storage memory.

28. An apparatus for determining centration parameters, the apparatus comprising:
a first camera for recording a first image from a first direction of view,
a second camera, calibrated with respect to the first camera, configured to record a second image from a second direction of view that differs from the first direction of view, and
a computer having a non-transitory storage memory in which a computer program is stored, the computer program comprising program code instructing the apparatus to:
provide at least two calibrated images, recorded from different directions of view, of the head of a subject;
ascertain geometric parameters that describe the position of the eyes with a geometric determination of position;
provide a three-dimensional data record describing geometric parameters of a spectacle frame;
relate the geometric parameters of the spectacle frame and the geometric parameters describing the position of the eyes to one another; and
calculate the centration parameters from the geometric parameters describing the spectacle frame and describing the position of the eyes,
wherein the data record describing the geometric parameters of the spectacle frame is provided as at least one three-dimensional point cloud, and wherein the computer comprises a processor configured to execute the computer program stored in the non-transitory storage memory.

29. A computer-implemented method for determining centration parameters, the method comprising:
providing at least two images of a head of a subject, wherein the at least two images are calibrated with respect to one another, wherein the at least two images are recorded from different directions of view, and wherein geometric parameters describing a position of eyes of the subject are ascertained by a geometric determination of position;
providing a three-dimensional data record describing geometric parameters of a spectacle frame, wherein the geometric parameters of the spectacle frame and the geometric parameters describing the position of the eyes of the subject are related to one another by a rigid transformation;
calculating the centration parameters from the geometric parameters describing the spectacle frame and describing the position of the eyes of the subject; and
providing the data record describing the geometric parameters of the spectacle frame as at least one three-dimensional point cloud,
wherein the data record describing the geometric parameters of the spectacle frame includes the orientation of the at least one three-dimensional point cloud in space.

30. A computer-implemented method for determining centration parameters, the method comprising:
providing at least two images of a head of a subject, wherein the at least two images are calibrated with respect to one another, wherein the at least two images are recorded from different directions of view, and wherein geometric parameters describing a position of eyes of the subject are ascertained by a geometric determination of position;
providing a three-dimensional data record describing geometric parameters of a spectacle frame, wherein the geometric parameters of the spectacle frame and the geometric parameters describing the position of the eyes of the subject are related to one another by a rigid transformation;
calculating the centration parameters from the geometric parameters describing the spectacle frame and describing the position of the eyes of the subject; and
providing the data record describing the geometric parameters of the spectacle frame as at least one three-dimensional point cloud,
wherein a plurality of three-dimensional point clouds is provided for different parts of the spectacle frame.

31. A computer-implemented method for determining centration parameters, the method comprising:
providing at least two images of a head of a subject, wherein the at least two images are calibrated with respect to one another, wherein the at least two images are recorded from different directions of view, and wherein geometric parameters describing a position of eyes of the subject are ascertained by a geometric determination of position;
providing a three-dimensional data record describing geometric parameters of a spectacle frame, wherein the geometric parameters of the spectacle frame and the geometric parameters describing the position of the eyes of the subject are related to one another by a rigid transformation;

calculating the centration parameters from the geometric parameters describing the spectacle frame and describing the position of the eyes of the subject;

providing the data record describing the geometric parameters of the spectacle frame as at least one three-dimensional point cloud; and projecting the data record describing the geometric parameters of the spectacle frame onto a two-dimensional plane.

* * * * *

UNITED STATES PATENT AND TRADEMARK OFFICE
CERTIFICATE OF CORRECTION

PATENT NO. : 11,397,339 B2  
APPLICATION NO. : 16/523075  
DATED : July 26, 2022  
INVENTOR(S) : Claudia Nieuwenhuis Page 1 of 1

It is certified that error appears in the above-identified patent and that said Letters Patent is hereby corrected as shown below:

On the Title Page

Item (57) In the abstract, Line 1, change "determining centring" to -- determining centring parameters --

In the Claims

Column 11, Line 33, Claim 23, change "eyes subject" to -- eyes of the subject --

Column 11, Line 66, Claim 24, change "eyes subject" to -- eyes of the subject --

Column 12, Line 30, Claim 25, change "eyes subject" to -- eyes of the subject --

Signed and Sealed this  
Twenty-fifth Day of October, 2022

Katherine Kelly Vidal  
*Director of the United States Patent and Trademark Office*